W. W. TAYLOR.
Tree-Protector.
No. 21,033.
Patented July 27, 1858.
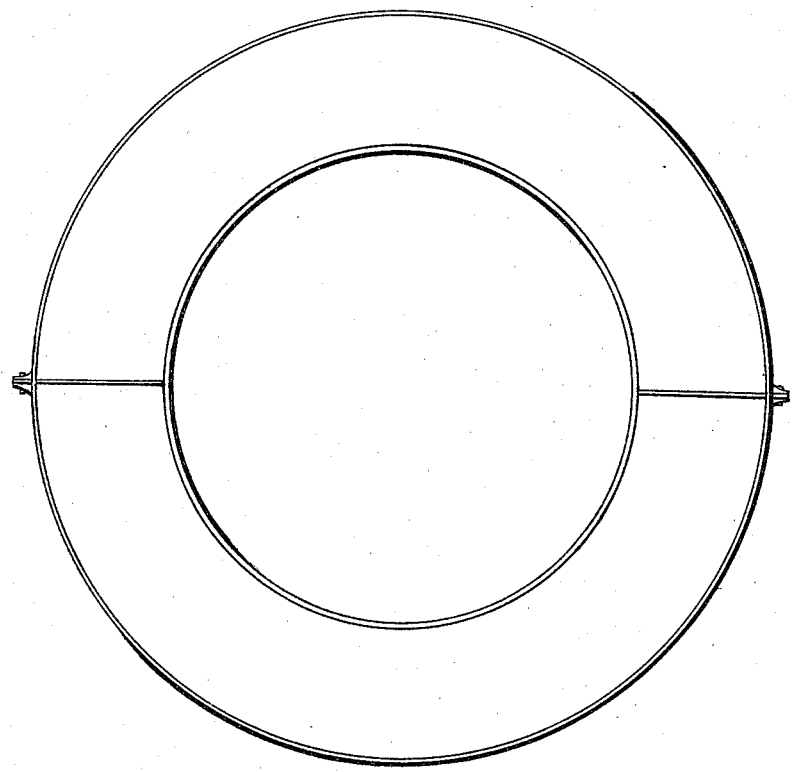
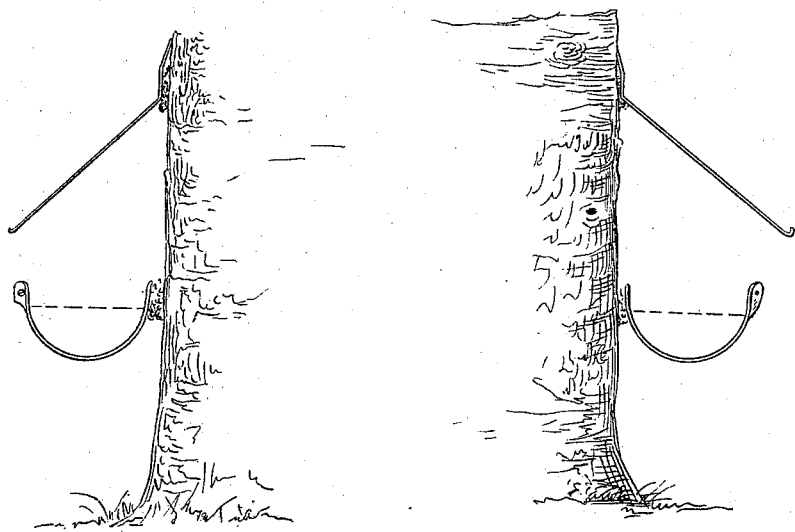

UNITED STATES PATENT OFFICE.

W. W. TAYLOR, OF DARTMOUTH, MASSACHUSETTS.

IMPROVEMENT IN COMPOUNDS FOR PROTECTING TREES FROM INSECTS.

Specification forming part of Letters Patent No. 21,033, dated July 27, 1858.

*To all whom it may concern:*

Be it known that I, WILLIAM W. TAYLOR, of Dartmouth, Massachusetts, have invented a new and improved method of preventing canker-worms and other insects from ascending trees by means of discovering a new liquid and devices for using it not hitherto used for such purpose; and I hereby declare that the following is a full and exact description thereof, reference being had to the accompanying drawings and references.

The nature of the invention consists in discovering a peculiar acrid saline liquid, exceedingly poisonous to insects, which will not dry up nor become hard, and which will not freeze during the ordinary temperature of February and March—the months when these insects climb fruit-trees—from the fact that the liquid readily absorbs moisture from the atmosphere and has no tendency to crystallize or solidify. Besides, this liquid does not freeze in Eastern States, even during the winter, and hence may be kept barreled with safety during the winter.

In the liquids hitherto used for such purposes there is some objection. To the oil there is the great cost of the liquid, and tar is so stiff that the animals soon make a bridge of their own bodies, and so go over, and the same objection is made to the oil. Saline solutions in general are objectionable, because the water evaporates and leaves solid salt; and, besides that, the ordinary saline solutions will freeze in cool nights in March in the latitudes where the apple and pear and plum flourish best.

The liquid which I have found free from all the above objections is the mother or bitter water left from the evaporation of sea-salt as obtained from sea or mineral water. It is in fact sea-water from which the common salt and the Glauber's salt and the Epsom salt have been crystallized out, leaving principally muriate of lime and muriate of magnesia—two deliquescent salts, which are not at all disposed to dry up or crystallize; nor will the liquid freeze during the ordinary winters of Massachusetts and Rhode Island or other similar latitudes. It is therefore particularly adapted to the purpose for which I have applied it. It is evident that any deliquescent salt—as muriate of lime by itself, or common potash, or muriate of iron, or muriate of zinc—might be used.

To carry out my invention I surround the trunk of the tree to be protected, at a suitable distance from the ground, with a circular trough, generally made of cast-iron, and made in two equal parts, as shown in the drawings in the lines *a a* and *b b*, Figure 1, the space A A constituting the trough to contain the liquid, the part B B representing the space occupied by the body of the tree; and *c c* represent the flanges, bolts, and nuts to fasten the two halves together.

Fig. 2 shows a complete section across the cup A and shield D in the line *a a b b* of Fig. 1, exhibiting the depth and form of the trough to contain the liquid. The joints at *a a* and *b b* are made by pressing in a thin sheet of india-rubber and screwing up nuts *c c*.

The shield D D may be made with projecting flanges like those of the trough, (seen at *c c*,) and the shield made in equal halves, or in any other suitable manner. The shield is best made of ordinary tin-plate or sheet-zinc. The edges are turned up at an angle of about forty-five degrees with the slope of the shield and nailed to the tree with small nails, as shown in Fig. 2; or, what is still better, it may be sustained by small wedges between it and the tree.

The cups A and shield D are placed in the proper position around the tree, and the intermediate spaces filled with cotton or any other suitable packing and fastened to the body of the tree by small nails in the same manner as directed for the shield D and as seen in Fig. 2, or by wedges, as described above. The liquid is now to be placed in the cup A so as to fill it about two-thirds full, and is to be inspected daily—in the morning—to remove the animals taken in the night, the only time they ascend the fruit-trees. They are scraped out with a pair of small perforate skimmers, one in each hand, that shall commence the skimming back to back on one side of the tree, and finish by meeting together with their charge on the other side.

The construction of the trough A in two pieces, as herein described, has not been claimed in the present application, although it is believed to be new; but it is designed to claim it in a separate application.

What I claim as my invention, and desire to secure by Letters Patent, is—

The application of the bitter water left in the manufacture of sea-salt or its equivalent to destroy canker-worms and other insects in their attempts to ascend trees, as set forth in the specification.

WM. W. TAYLOR.

Witnesses:
G. W. BENSON,
S. D. GALE.